Feb. 19, 1952

J. J. KEYES 2,586,344

PHENOLIC-OIL MODIFIED ALKYD-COPAL
RESINOUS COMPOSITIONS
Filed Jan. 25, 1950

WITNESSES:

INVENTOR
John J. Keyes.
BY
ATTORNEY

Patented Feb. 19, 1952

2,586,344

UNITED STATES PATENT OFFICE 2,586,344

PHENOLIC-OIL MODIFIED ALKYD-COPAL RESINOUS COMPOSITIONS

John J. Keyes, Buffalo, N. Y., assignor to Westinghouse Electric Corporation, East Pittsburgh, Pa., a corporation of Pennsylvania Application January 25, 1950, Serial No. 140,506

2 Claims. (Cl. 260—20)

This invention relates to a resinous composition suitable for application to electrical conductors provided with electrical insulation composed of glass fibers in the form of sliver or yarn for producing a smooth, highly insulative coating on the conductor.

This application is a continuation-in-part of my copending application Serial No. 749,548 issued as Patent 2,504,845 which is a continuation-in-part of copending patent application Serial No. 496,581, filed July 29, 1943, now abandoned and assigned to the same assignee.

Glass fibers are sold to the trade in two main forms suitable for applying to electrical conductors. Continuous fibers prepared from continuous filaments of spun glass of a diameter of less than 0.002 inch have been used almost exclusively for coating electrical conductors, particularly in the standard magnet wire sizes. One or more thicknesses of the continuous filament spun glass fibers can be wrapped closely together about the electrical conductor to produce a relatively thin and smooth insulation.

The second commercially available form of glass fibers is sliver or yarn. In sliver and yarn staple glass fibers in small lengths of the order of from one inch to eighteen inches are combined into a loose mass.

When glass fibers in the form of sliver or yarn are applied to electrical conductors, it was the previous experience that thin layers having a smooth surface were substantially impossible to produce. The numerous short lengths of glass fibers protruded when the sliver or yarn was applied to the conductor to produce a rough fuzzy or woolly surface. When a conventional resin was applied to this material in order to impregnate it, the final cured product was exceedingly rough with numerous projecting glass fibers present on and extending out from the surface. Also it was a relatively dusty material, since the projecting fibers break off in handling. The handling of the material caused skin irritation due to the projecting glass fibers penetrating the skin. Tight coils, for example, could not be produced from sliver coated conductors previous to this invention. Therefore, space efficiency would have to be greatly reduced if glass sliver were employed upon conductors. Further, on bending the conductors, it was found that the turns of sliver separated readily to expose the bare conductors. Burnishing dies and similar devices have been relatively ineffective in producing satisfactory surface coatings of glass sliver on conductors. Accordingly, the art has been limited to a great extent to the use of the glass fibers in the form of continuous filaments.

In some cases, sliver composed of staple fibers is drawn and twisted into what is designated in the art as "staple yarn." Such staple yarn is a tighter twisted product than sliver, but when applied to conductors under prior art practice, it results in an even more objectionable roughness with loose, protruding glass fibers being present.

Since synthetic glass fibers consisting of continuous filaments are approximately three times as expensive per pound as compared to the glass fibers in the form of sliver, it is desirable to employ glass sliver for economical reasons. Due to the above-mentioned factors of rough surface and projecting fibers, it has been substantially impractical to employ the glass sliver even though the difference in price of the materials favors sliver.

The object of this invention is to provide an aqueous resinous composition particularly adapted for application to loose glass fibers in the form of sliver or yarn.

A further object of this invention is to provide a method for applying glass fibers in the form of sliver to a conductor in combination with an aqueous resinous binder composition to produce a smooth surfaced, tightly adherent, insulating coating upon the conductor.

Other objects of the invention will in part be obvious and will in part appear hereinafter.

For a fuller understanding of the nature and objects of the invention, reference should be had to the following detailed description and drawing, wherein.

Figure 1:
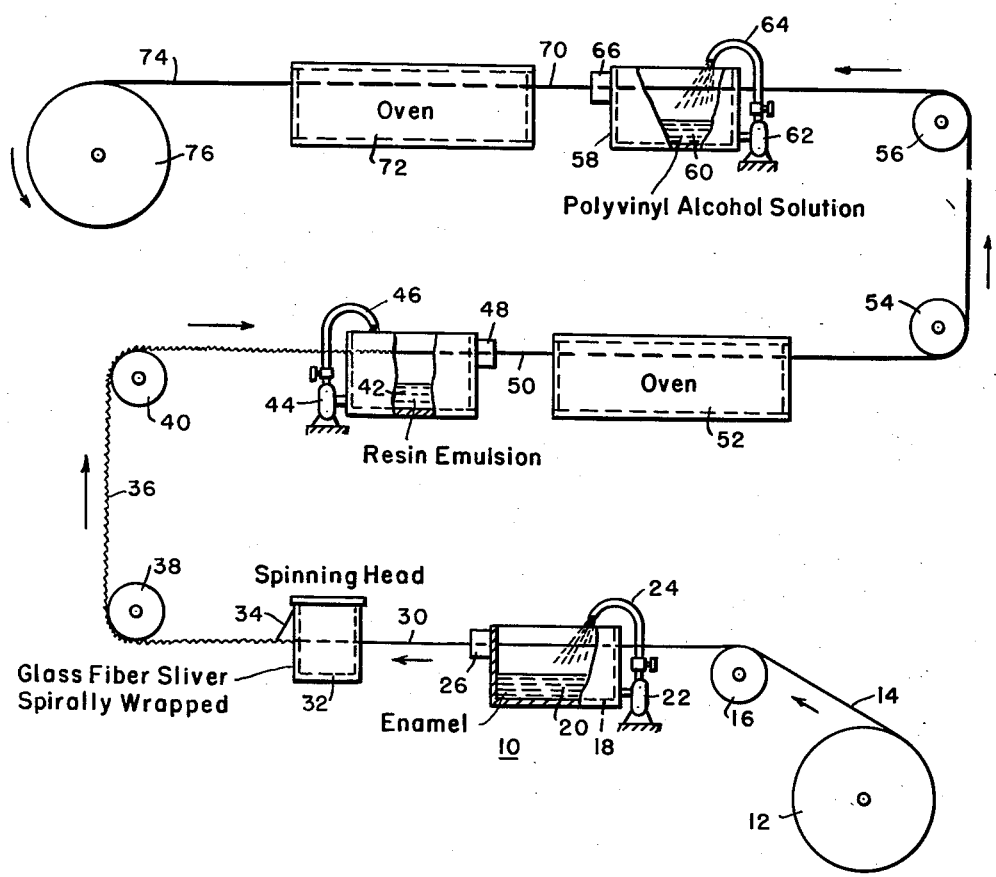
Figure 1 is a schematic view of the process of the invention.

According to the present invention, conductors are wrapped with glass fibers in the form of sliver or yarn composed of relatively loosely associated short lengths of fiber by treating the applied sliver with a particularly resinous composition, whereby there is producted a conductor coating that is extremely smooth and highly insulative. The resinous composition draws in and closely binds the loose projecting fibers of the sliver or yarn, thereby producing a commercially satisfactory product. Furthermore, the resinous composition provides for a tenacious adherence of the glass fibers to the conductor, whereby the conductor may be flexed and bent considerably without causing cracking or separation from the conductor. An indication of the quality of the insulation is the fact that two crossed wires so produced may be hammered without shorting.

The resinous composition which has rendered it commercially satisfactory to employ glass sliver and yarn for insulating electrical conductors is an aqueous emulsion in which the dispersed phase is a solution of a phenol formaldehyde resinous condensate combined with an oil modified alkyd resin and a hard natural copal resin, all dissolved in a solvent for the three resinous materials. Water, which may have some of a water soluble organic solvent therein, forms the continuous phase of the emulsion. The water is preferably alkaline and may include wetting agents. Polyvinyl alcohol is an important part of the resinous insulation. The emulsion may include the polyvinyl alcohol, commonly produced by hydrolyzing a polyvinyl ester. In other cases, the polyvinyl alcohol is applied as a separate coating to the conductor in combination with a coating of the aqueous resinous emulsion.

It has been found that phenolic resins most suitable for combining with an oil modified alkyd resin are prepared from ortho or para alkyl substituted phenols such as cresols, cresylic acid, paratertiary butyl phenols and the like reacted with from about 1 to 1.5 moles of formaldehyde for each mole of the phenol. Phenolic resins prepared from hydroxy benzene are not as readily compatible with oil modified alkyds as substituted phenols. In some cases drying vegetable oils may be reacted with the phenol and formaldehyde. An amount of from 10% to 50% of the weight of the phenol may be a drying vegetable oil such as tung oil, palm oil, soya bean oil or linseed oil. Example of suitable proportions of reactants and reaction conditions is set forth in Patent 2,383,283 to Auxier et al.

Since the resinous composition renders the use of glass sliver possible with satisfactory commercial results, its preparation is illustrated by the several following examples:

EXAMPLE NO. 1

Cresylic acid and formaldehyde are reacted in equimolar proportions in the presence of an alkaline catalyst. From about 1 to 1.5 moles of formaldehyde per mole of cresylic acid are suitable proportions. Formaldehyde or polymers of formaldehyde or substances engendering formaldehyde may be used in producing the phenolic resin. Suitable catalysts are organic amines, and alkali metal and alkali earth metal hydroxides and carbonates. Sodium hydroxide, barium hydroxide, and ethylene diamine are examples. When the "A" stage of reaction has been substantially reached, the resin is precipitated in water in order to remove excess phenol. A substantially phenol-free reaction product is desirable, but not critical, for the purpose of the invention. After purification in water, the phenol-formaldehyde condensate is removed and dissolved in solvents therefor. A mixture of ethyl alcohol and ethyl acetate is an example of a suitable solvent.

In another reaction vessel, two parts of phthalic anhydride, one part of glycerol, and one part of linseed oil, all proportions being by weight, are reacted for about one-half hour at temperatures of from 180° C. to 200° C. The condensation product should be continually stirred and the temperature increased at the end of the half-hour initial period to about 220° C. for from one-half hour to three-quarters of an hour. This product will be designated an oil-modified alkyd resin.

The main requirement to be met by the alkyd resin product is that it be highly flexible when dried in films. To provide for this flexibility, effective quantities of fatty vegetable oils, drying oils or oil acids having more than 12 carbon atoms in a chain, or mixtures, should be reacted with a dibasic acid and a polyhydric alcohol by heating above 130° C. Examples of suitable oils are linseed oil, soybean oil, fish oils, castor oil, and tung oil, and oil acids such as ricinoleic acid. The dibasic acids may be saturated or unsaturated dicarboxylic acids such as succinic, maleic, fumaric, citraconic, adipic, phthalic or sebacic acids or their anhydrides, or mixtures thereof. The polyhydric alcohols reacted therewith may be ethylene gylcol, glycerol, trimethylene gylcol, diethylene gylcol, pentaerythritol and the like and mixtures thereof. The proportions of the three reactants may be varied to meet requirements, but in general, it is preferred to react the dibasic acid and polyhydric alcohol components in approximately equimolar quantities or in nearly equal proportion of carboxyl to hydroxyl groups, provided by the dibasic acid and the polyhydric alcohol respectively, or not over a 30% excess of either over stoichiometric esterification proportions. The oil or fatty acid may vary from 10% to 75% of the weight of the combined acid and polyhydric alcohol.

The phenol-formaldehyde resin in the "A" stage is combined with the oil-modified alkyd resin in the proportion of from 10 to 25 parts of the phenol-formaldehyde resin and from 25 to 100 parts of the oil-modified alkyd resin. With the larger proportions of phenol-formaldehyde the composite resin will produce a much harder body or coating after curing by a heat treatment. With the maximum quantities of the alkyd resin, a much more flexible and plastic film is produced after curing by heat treatment. Depending upon the fineness of the conductor to which the resin is to be applied and the degree of deformation to which the conductor is to be subjected, the proportions may be varied to meet the flexibility and hardness desired in the final resin.

It has been discovered that while this resin composition has good characteristics when applied to glass fibers, the desirable results of this invention are not completely attained unless a polyvinyl alcohol or hydrolyzed polyvinyl ester is employed therewith. In one form of the invention, polyvinyl alcohol is initially directly added to the emulsion. The following formulation will produce satisfactory results:

*Formula No. 1*

| | |
|---|---|
| Polyvinyl alcohol (46% hydrolyzed polyvinyl acetate) | 6 lbs. |
| Copal (Manila) | 1½ lbs. |
| Wetting agent | 3 lbs. |
| Diluted ammonia 13% | 3 lbs. |
| Phenolic-oil modified alkyd varnish of Example I in alcohol-ethyl acetate solvent—50% solids | 36 gals. (circa 280 lbs.) |
| Water | 12 gals. (circa 100 lbs.) |

The engredients in the formula may be combined to produce an emulsion in the following manner. The 36 gallons of varnish solution are poured into a large mixing vessel capable of holding 50 gallons and provided with a power mixer. The mixer is put into operation as soon as the varnish has been introduced. The copal, preferably dissolved previously in an equal weight of ethyl alcohol in order to provide for easy admixing, is then added. The wetting agent is added along with the ammonia. Finally the water with the polyvinyl alcohol dissolved in it is added slowly, and the whole mixed for several hours. An emulsion will be produced that is capable of standing for a prolonged period of time without separating. If separation does occur, a slight mixing or stirring is usually sufficient to bring the ingredients back into a satisfactory suspension.

In the above formula, the amount of polyvinyl alcohol may be varied from 3 pounds to 60 pounds. "Polyvinyl alcohol," as employed herein, denotes the products of hydrolysis of polyvinyl esters; particularly good results have been obtained with the hydrolyzed polyvinyl acetate, though other esters may be employed. Highly satisfactory results have been obtained with a polyvinyl alcohol derived by hydrolyzing polyvinyl acetate 46%, the polyvinyl alcohol being of such molecular weight that a 4% aqueous solution at 20° C. had a viscosity of about 50 centipoises. Another successfully used polyvinyl alcohol comprised a 99% hydrolyzed polyvinyl acetate of equally high molecular weight. Polyvinyl alcohols of 37% hydrolysis or lower can be used. Mixtures of various polyvinyl alcohols may be used.

The copal resin is preferably Manila copal, through other copals, such as fused Congo, or other hand natural fossil resins which are soluble in hydrocarbon solvents may be employed. In one case, one pound of Manila copal dissolved in one pound of ethyl alcohol formed a solution which was conveniently used in preparing the formulation. In another case, four pounds of fused Congo was dissolved in six pounds of solvent composed of one part alcohol to four parts of a mixture of liquid aromatic hydrocarbons comprising benzene, xylene and toluene as the main constituents. The prime function of the copal is to assist in producing a stable emulsion. The amount of the copal resin should be from ½% to 2% of the total weight of the phenol-aldehyde and oil-modified alkyd resin solids. In practice, excellent results were obtained by using a copal in an amount equal to about 1% of the total of the cured resin in the insulation. An excess of copal above 2% is not detrimental, but it will not improve the emulsion stability.

Other alkaline materials besides ammonia may be applied to the water, though ammonia appears to be the most convenient material for this purpose. Examples of such other materials are ethanolamine, sodium hydroxide, morpholine and fatty acid soaps of ethanolamine. In general, an alkaline substance peptizes the emulsion and results in a better product.

Any of the great number of available wetting agents may be employed. Isopropyl naphthalene sodium sulfonate sold under the trade name Aerosol OS; the dioctyl, diamyl, dibutyl and dihexyl esters of sodium sulfosuccinic acid, sold as Aerosol OT and other trade names, the sodium salt of aryl alkyl ether sulphate sold under the trade name Triton, the sodium sulphate salts of long chain aliphatic hydrocarbons sold under the trade name Tergitol, and sodium tetra-hydronaphthalene sulphonate sold under the trade name Alkanol S, for example may be used in Formula No. 1. Other suitable wetting agents are the polyoxyethylene esters of the sorbitans of oleic, lauric, stearic, palmitic and resin acids; sorbitan esters of oleic, lauric, palmitic and oleic acids; alcohol sulfates such a sodium lauryl sulfate; alkyl aryl sulfonates such as dodecyl phenyl sodium sulfonate, and lauryl sulfobenzoate; alkyl sulfonates such as sodium dodecyl sulfonate; and sulfated and sulfonated amines and amides including alkyl groups having from 12 to 18 carbon atoms in a chain attached to the nitrogen atom and the sulfate or sulfonate radical. The proportions of the wetting agent may vary from 0.1% to 5% of the weight of the composition.

EXAMPLE NO. 2

A mixture of maleic acid, glycol and castor oil, using approximately equal weights of each, reacted at temperatures of about 200° C. for one to two hours, with removal of water vapor, will produce an oil-modified alkyd resin suitable for the purpose of this invention. The oil-modified alkyd resin may be combined with substantially phenol-free, phenol formaldehyde in the proportions as set forth in Example No. 1.

In practicing the invention, bare conductor wire to be insulated may be first coated with a conventional wire enamel, or the emulsion of Formula No. 1, or other resinous composition having adhesive properties and curing to good electrical insulation, so that the glass sliver will adhere thereto. Such coatings are only partially dried so as to leave them quite tacky and then the glass sliver is wrapped around the conductor in thickness as desired. The emulsion, as in Formula No. 1, is applied one or more times to the wrapped conductor, with baking between successive applications. This will result in a smooth covering free from the projecting glass fibers.

In some cases, a final coating of polyvinyl alcohol may be applied as a 3% to 15% aqueous solution to the conductor and heat treated to give a very smooth product.

Best results in practicing the invention have been produced by applying polyvinyl alcohol separately from the resinous varnish emulsion to the glass sliver. A resin emulsion suitable for use in this manner is shown by the following:

*Formula No. 2*

| | |
|---|---|
| Phenol aldehyde, oil-modified alkyd varnish in ethyl acetate-ethyl alcohol solvent— 50% solids by weight | 36 gals. (circa 280 lbs.) |
| Copal varnish: 7 parts by weight of Manila copal in 8 parts of ethyl alcohol | 3 pts. (3 lbs.) |
| Wetting agent | 3 pts. (3 lbs.) |
| 13% ammonia | 3 pts. (3 lbs.) |
| Water | 12 gals. (100 lbs.) |

The weights are given in round numbers. The ingredients were mixed to produce an emulsion in the same manner as set forth in Formula No. 1. This formulation will produce approximately 50 gallons of composition.

Polyvinyl alcohol suitable for applying separately may consist of from a 3% to a 15% aqueous solution of polyvinyl alcohol. In some cases even more dilute polyvinyl alcohol solutions than 3% solutions may be employed. With highly hydrolyzed polyvinyl esters, water alone is a good solvent. Water-ethyl alcohol composition, up to 50% alcohol content, may be employed as a carrier or solvent for the polyvinyl alcohol.

Referring to Fig. 1 of the drawing, there is illustrated schematically on apparatus 10 for practicing the invention. A reel 12 of bare copper wire 14 of any suitable shape or size provides the wire to be treated at the lower end of the apparatus. Copper wire 14 passing over the pulley 16 is drawn through the tank 18 in which a solution of enamel 20 or other resinous material is contained. The enamel 20 is pumped by the pump 22 to a distributor 24 for spreading the enamel on the copper conductor 14. A wiping head 26 of sponge rubber or equivalent material may be employed for removing excess wire enamel from the conductor, the excess enamel flowing back into the tank 18 for reuse.

The enamel 20 may consist of the emulsion of Formula No. 2, though it is usually more convenient in many cases to employ a conventional wire enamel dissolved in an organic solvent.

The coated conductor 30 is dried only sufficiently to remove a portion of the solvent without causing the enamel 20 to become hard since it is desirable that the enamel be in a tacky state. The enamel coated conductor 30 passes through a spinning head 32 containing a supply of glass sliver or yarn for application to the conductor. When rotating at a high rate of speed, one or more wrappings 34 of the glass fiber sliver or yarn is continuously spirally applied by the head 32 upon the adhesive resin coating to produce the wrapped conductor 36. The wrapping at this stage is characterized by a fuzzy appearance due to a great number of projecting fibers. Two layers of glass sliver applied in opposite directions have been applied with good results.

The wrapped conductor 36 after passing over pulleys 38 and 40 passes into a tank 42 in which the resin emulsion, such as that of Formula No. 2, is applied thereto by the pump 44 and distributor nozzle 46. The resin emulsion flows over the conductor 36 and saturates the glass fibers. A loose wiper 48 removes the excess emulsion which may be present on the conductor. The wrapping of sliver on the conductor now has a smoother appearance as shown at 50. The conductor 50 is passed through the oven 52 where the resin emulsion is dried and the resins baked in place.

After passing over pulleys 54 and 56, the treated conductor goes through the tank 58 containing a 3% to 15% aqueous solution 60 of polyvinyl alcohol which is pumped by pump 62 and distributor nozzle 64 over the conductor and excess polyvinyl alcohol solution is removed by the loose wiper 66. The coated wire 70 is heat treated in the oven 72, and the final product 74 is wound up on a spool 76.

Illustrative of the amounts of resin and polyvinyl alcohol applied to glass is the following example. A resin emulsion corresponding to Formula No. 2, and containing approximately 37% resins, was applied to glass sliver wrapping on a conductor, then an equal volume of a 5.7% of polyvinyl solution in water was applied. The weight ratio of polyvinyl alcohol to the resins so applied was roughly 1:6.5. Weight ratios of polyvinyl alcohol to resin as low as 1:15 and as high as 1:2 can be applied with beneficial results.

In many instances, it may be desirable to repeat the treatment of the conductor 74 with resin emulsion and polyvinyl alcohol one or more times depending on the size of the conductor and the amount of sliver applied thereto.

Figure 2:
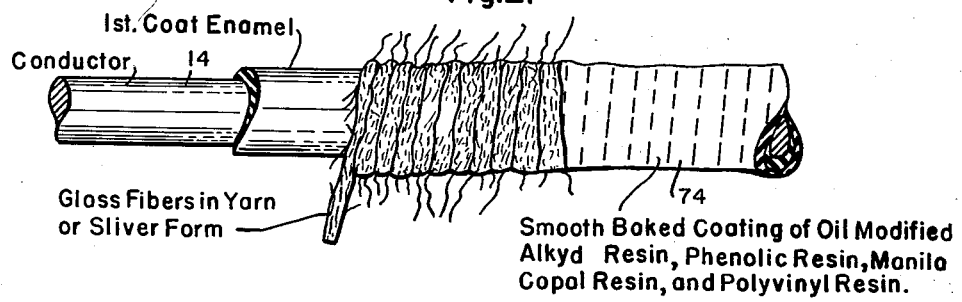
Fig. 2 is a fragmentary section of a conductor in various stages of manufacture.

In order to illustrate the changes produced by the application of the several materials to the conductor 14, reference should be had to Fig. 2 of the drawing. As shown progressively from left to right, the bare conductor 14 is initially coated with enamel 100 which, while still in a tacky condition, has glass yarn or sliver 102 applied thereto. The yarn of sliver wrapping has a great number of projecting fibers and the wrapped conductor is quite fuzzy or woolly in appearance. It is relatively rough as to surface condition. The application of the resin emulsion and polyvinyl alcohol pulls in the projecting fibers and binds them tightly to the conductor and produces a much smoother coating. The smooth surface final product is a highly satisfactory commercial article.

The advantages associated with the use of the resin emulsion, particularly that of Formula No. 2, are several in number and are quite valuable. A liquid of low viscosity should be employed in order that the glass sliver be thoroughly saturated and impregnated. Organic solvents are relatively expensive, and evaporation of a large amount of organic solvent from a low viscosity, low resin solid content solution would not only increase the cost of the product, but entail a fire hazard. An aqueous emulsion, on the other hand, may be readily diluted to any degree with water at low cost and with a decrease in fire hazard.

The use of the wipers 48 and 66 is attended with some difficulty, since the glass sliver is quite loose and will not stand any close wiping without being adversely affected. By employing a dilute aqueous emulsion, the wiping need not be as careful or critical, with satisfactory results being obtained. Higher operating speeds and higher temperatures in the heat treating apparatus may be achieved without added fire hazard when using an aqueous emulsion, since the oven temperatures may be quite high with safety, whereas safety requirements set a limit of relatively low temperatures and high air volumes in heat treating resin compositions dissolved entirely in organic solvents. For instance, wire $\frac{1}{16}$ inch in diameter has been successfully treated at speeds of over 50 feet a minute when aqueous emulsions are employed.

Further experience has shown that the resin-water emulsions give a somewhat smoother finish than has been obtained by the use of organic solvent-containing solutions of the phenol formaldehyde-oil modified alkyd resins.

Almost any order of applying polyvinyl alcohol solution and the resin emulsion solution of Fig. 2 may be carried out. In most cases, however, polyvinyl alcohol when applied as the final coating for the conductor will provide the best results.

Conductors which may be treated by the practice of the invention may be either solid wire of any predetermined cross-sectional shape or stranded wire. Flat copper strap, square bars and round conductors have been treated by the practice of this invention with equal facility.

Since certain changes in carrying out the above process, and certain modifications in the article which embody the invention may be made without departing from its scope, it is intended that all matter contained in the above description or shown in the drawing shall be interpreted as illustrative and not in a limiting sense.

I claim as my invention:

1. A resin emulsion suitable for treating glass fibers comprising essentially, in combination, water as the continuous phase, alkali, polyvinyl alcohol, and a wetting agent being dissolved in the water, and a dispersed phase composed essentially of ½ to 2 parts by weight of copal, and 100 parts by weight of a mixture composed of 100 to 25 parts by weight of an oil-modified alkyd resin derived by reacting (a) an acid compound selected from the group consisting of dicarboxylic organic acids and their anhydrides, (b) a polyhydric alcohol and (c) from 10% to 75%, based on the weight of the acidic compound and polyhydric alcohol, of an aliphatic hydrocarbonoxy compound having more than 12 carbon atoms in a chain selected from the group consisting of vegetable oils, animal oils and fatty acids derived from these oils, and 10 to 25 parts by weight of an A-stage phenol-formaldehyde resin, the phenol-formaldehyde resin derived by reacting one mole of an alkyl substituted phenol with from about 1.0 to 1.5 moles of formaldehyde with an alkaline catalyst, the copal being only mechanically admixed in the emulsion.

2. A resin emulsion suitable for treating glass fibers comprising essentially, in combination, 100 parts by weight of water in the continuous phase, and a dispersed phase composed of about 140 parts by weight of an oil-modified alkyd resin derived by reacting (a) an acid compound selected from the group consisting of dicarboxylic organic acids and their anhydrides, (b) a polyhydric alcohol and (c) from 10% to 75%, based on the weight of the acidic compound and polyhydric alcohol, of an aliphatic hydrocarbonoxy compound having more than 12 carbon atoms in a chain selected from the group consisting of vegetable oils, animal oils and fatty acids derived from these oils, and an A-stage phenolic resin derived by reacting one mole of an alkyd substituted phenol with from about 1 to 1.5 moles of formaldehyde with an alkaline catalyst, the weight proportion of alkyd resin being from 100 to 25 parts and the phenolic resin being from 10 to 25 parts, 140 parts of an organic solvent for the resins, 6 parts of a solution of copal resin dissolved in approximately an equal amount of solvent, from 3 to 60 parts by weight of polyvinyl alcohol, and 6 parts of a wetting agent.

JOHN J. KEYES.

REFERENCES CITED

The following references are of record in the file of this patent:

UNITED STATES PATENTS

| Number | Name | Date |
|---|---|---|
| 2,046,318 | Brubaker | July 7, 1936 |
| 2,494,810 | Hobday et al. | Jan. 17, 1950 |

FOREIGN PATENTS

| Number | Country | Date |
|---|---|---|
| 499,065 | Great Britain | Jan. 18, 1939 |
| 581,520 | Great Britain | Oct. 16, 1946 |